United States Patent
Heimann et al.

[11] Patent Number: 5,340,064
[45] Date of Patent: Aug. 23, 1994

[54] WALL-MOUNT BRACKET FOR HAND SHOWER

[75] Inventors: Bruno Heimann, Frondenberg-Ardey; Christian Frankholz, Schwerte, both of Fed. Rep. of Germany

[73] Assignee: Friedrich Grohe Aktiengesellschaft, Hemer, Fed. Rep. of Germany

[21] Appl. No.: 936,613

[22] Filed: Aug. 27, 1992

[30] Foreign Application Priority Data

Aug. 30, 1991 [DE] Fed. Rep. of Germany ....... 4128831

[51] Int. Cl.[5] .................... E03C 1/06; B05B 15/06
[52] U.S. Cl. ............................. 248/75; 4/615
[58] Field of Search .......... 248/75; 4/615; 239/283, 239/588

[56] References Cited

U.S. PATENT DOCUMENTS

| | | | |
|---|---|---|---|
| 3,979,096 | 9/1976 | Zieger | 248/75 |
| 4,174,822 | 11/1979 | Larsson | 248/75 |
| 4,964,573 | 10/1990 | Lipski | 248/75 |

FOREIGN PATENT DOCUMENTS

2844190 3/1980 Fed. Rep. of Germany .
3506120 8/1986 Fed. Rep. of Germany .
3507290 9/1986 Fed. Rep. of Germany .

OTHER PUBLICATIONS

European Search Report, with translation, listing the three German patents enclosed herewith.

*Primary Examiner*—Hien H. Phan
*Attorney, Agent, or Firm*—Herbert Dubno; Andrew Wilford

[57] ABSTRACT

A bracket for supporting a hand shower adjacent a wall has a base part adapted to be fixed to the wall, formed with a throughgoing passage extending along a horizontal axis generally parallel to the wall, and having axially oppositely directed sides. A holder part pivotal on the base part about the axis on one of the axial sides of the base part is formed on the axis with an upwardly open seat adapted to receive the hand shower. A bolt extending axially through the passage has to the other axial side of the base part a threaded end and to the one axial side of the base part a radially projecting flange bearing axially toward the base part on the holder part. Interengaging formations on the bolt and base part rotationally fix the bolt in the base part while permitting it to move axially therein. A nut threaded on the threaded end of the bolt and bears axially on the other axial side of the base part.

7 Claims, 4 Drawing Sheets

WALL-MOUNT BRACKET FOR HAND SHOWER

FIELD OF THE INVENTION

The present invention relates to a wall-mount bracket for a hand shower. More particularly this invention concerns such a device which adjustably and releasably holds a hand shower.

BACKGROUND OF THE INVENTION

A standard telephone or hand shower is a shower head mounted on one end of a handle from whose other end extends a hose connected to the water supply. While such a shower is mainly intended for use while it is being held, it is standard to fit it to a wall-mounted bracket assembly that holds it so that it can function as a standard stationary shower. Like such a stationary shower, the bracket assembly normally permits some range of adjustment of the shower to direct the spray where it is wanted.

Accordingly German patent 2,844,190 filed October 1978 by M. Pawelzik et al describes a mounting bracket basically comprised of a stationary wall-mounted support body, a holder body pivotal about a normally horizontal axis parallel to the wall and formed offset from this axis with a seat adapted to hold the hand shower, and a bolt-and-nut assembly extending along the axis. The bolt serves not only as the pivot axis, but it allows the two parts to be secured together axially with sufficient force to frictionally impede them from moving relative to each other, unless of course considerable force is brought to bear, as when the position is being adjusted.

This arrangement has two main disadvantages. First of all it holds the shower relatively far from the wall and moves it in a relatively wide arc when it is adjusted. This makes accurately positioning it difficult. Second, the bolt itself typically bears angularly on one part and the nut on the other so that adjustment in one direction will tighten the nut and opposite adjustment will loosen it.

OBJECTS OF THE INVENTION

It is therefore an object of the present invention to provide an improved mounting bracket for a hand shower.

Another object is the provision of such an improved mounting bracket for a hand shower which overcomes the above-given disadvantages, that is which holds the hand shower close to the wall and moves its shower head in a small arc when adjusted, and whose friction setting does not change when it is adjusted.

SUMMARY OF THE INVENTION

A bracket for supporting a hand shower adjacent a wall has according to the invention a base part adapted to be fixed to the wall, formed with a throughgoing passage extending along a horizontal axis generally parallel to the wall, and having axially oppositely directed sides. A holder part pivotal on the base part about the axis on one of the axial sides of the base part is formed on the axis with an upwardly open seat adapted to receive the hand shower. A bolt extending axially through the passage has to the other axial side of the base part a threaded end and to the one axial side of the base part a radially projecting flange bearing axially toward the base part on the holder part. Interengaging formations on the bolt and base part rotationally fix the bolt in the base part while permitting it to move axially therein. A nut threaded on the threaded end of the bolt bears axially on the other axial side of the base part.

Thus with this system the bolt is rotationally coupled to the base part and the nut bears on this base part so relative pivoting of the base and holder parts will not screw the nut on the bolt. In addition since the showerhead seat is traversed by the pivot axis, the shower head will move in a relatively small arc.

According to another feature of this invention one of the parts, normally the base part, is formed centered on the axis with an angularly limited arcuate slot open axially toward the other part. The other part, normally the holder part, is formed with a lug projecting axially toward the one part and fitting in the slot so that the interfit of the slot and lug limits the relative angular displaceability of the parts.

The base part is formed with at least one axially throughgoing cutout opening radially into the passage and constituting one of the formations. The bolt is formed with a radially projecting tab engaged in the cutout and constituting another of the formations. Furthermore the flange is formed with at least two angularly equispaced and radially outwardly projecting lugs. The holder part is formed in part as a ring normally axially traversed by the bolt and having radially inwardly open notches at least as big as the respective lugs so that the lugs can pass through the notches to engage the flange behind the ring. This makes assembly and disassembly of the bracket relatively easy.

The housing part is formed on its other side centered on the axis with an axially outwardly open recess. The bracket further has a spring element seated in the recess and compressed between the base part and the nut. More particularly the holder part includes a ring forming a surface against which the flange bears and a molded part forming the seat and permanently fixed to the ring. The parts and bolt are made of a synthetic resin.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
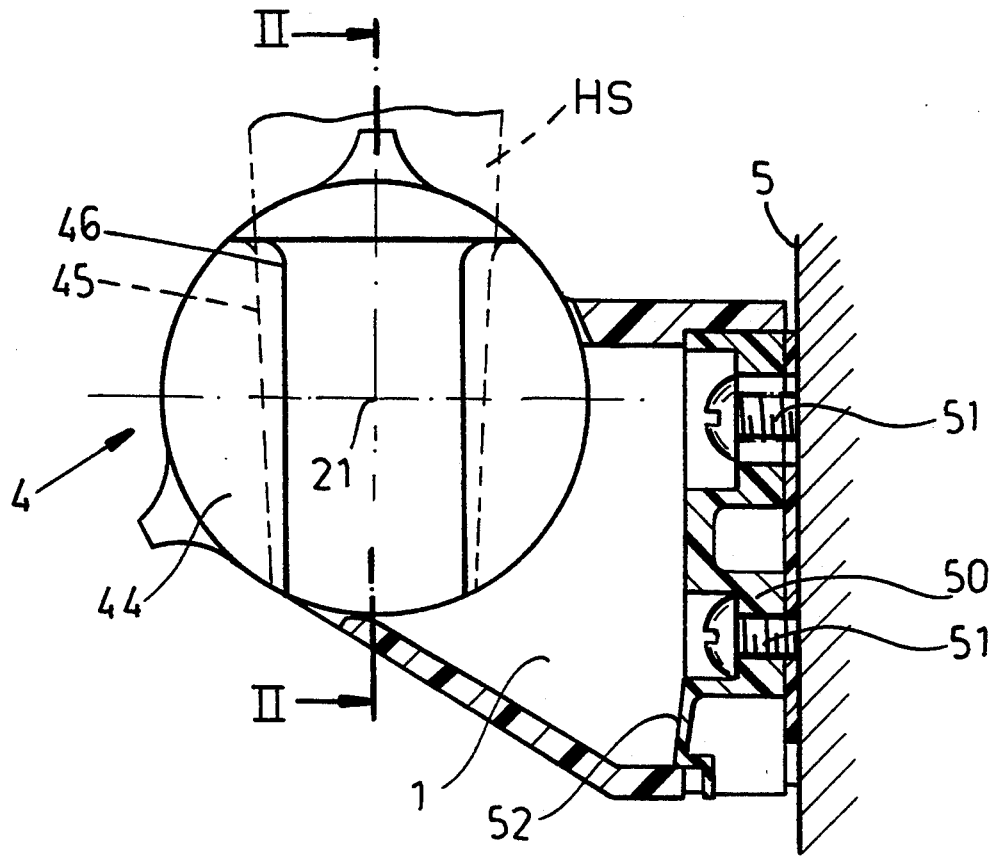
FIG. 1 is a side view partly in vertical section through the bracket assembly of this invention.
Figure 2:
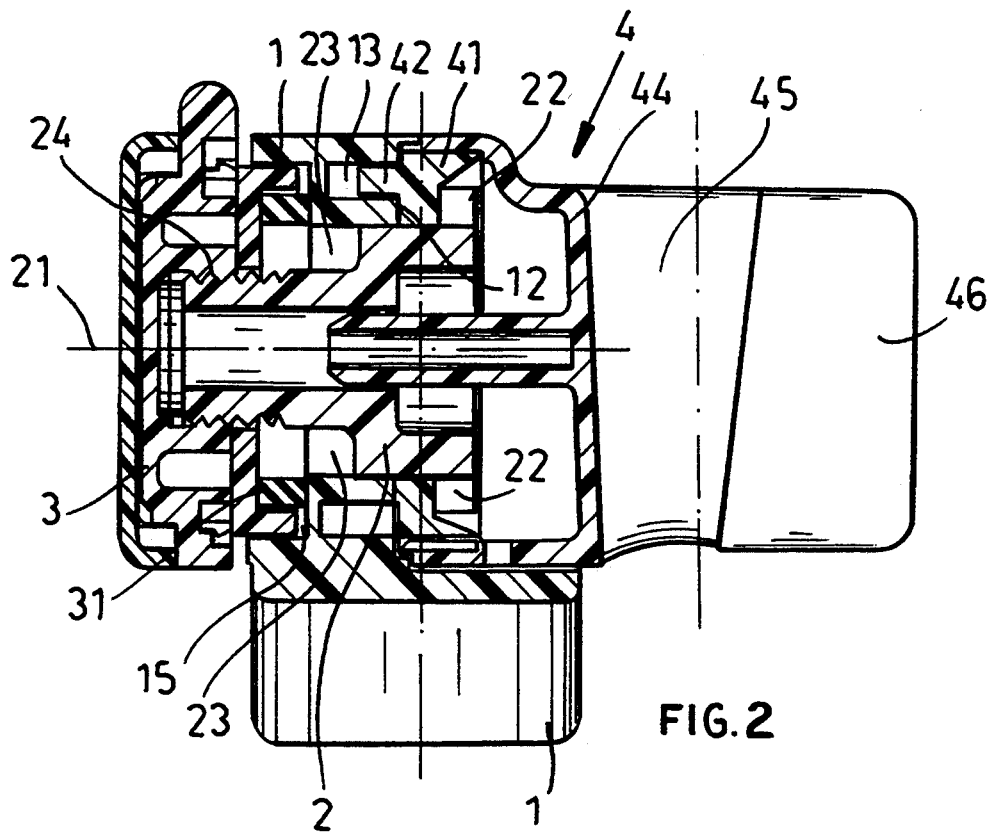
FIG. 2 is a section taken along line II—II of FIG. 1.

As seen in the drawing a bracket assembly according to this invention basically comprises a normally stationary support element or part 1, a bolt 2, a nut 3, a spring element 31, and a holder element or part 4.

Figure 3:
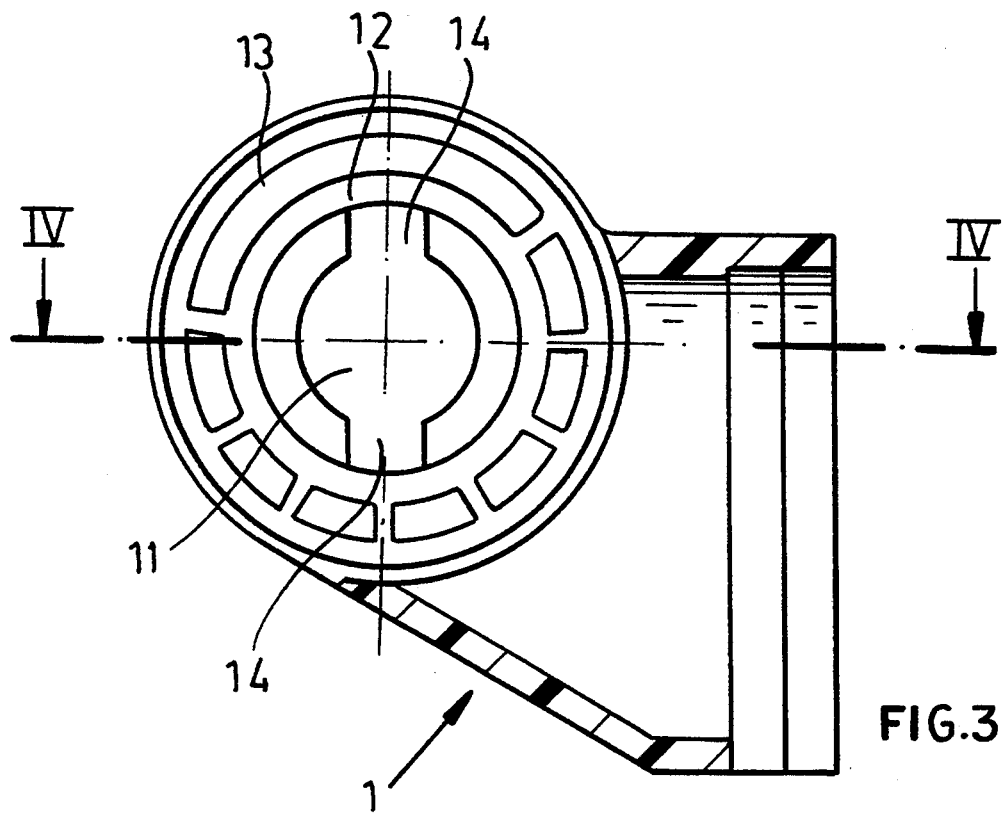
FIG. 3 is a side view partly in vertical section through the base element of the bracket assembly.
Figure 4:
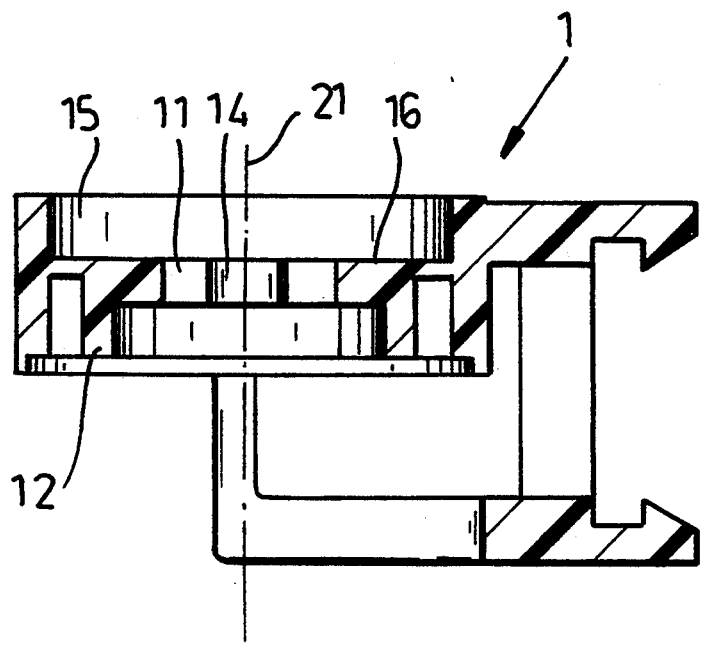
FIG. 4 is a section taken along line IV—IV of FIG. 3.

The support element 1 is made of a durable injection-molded synthetic resin and is normally fixed to a wall 5 by slipping it down over a mounting plate 50 that is secured by screws 51 to the wall 5. A deflectable clip 52 holds the element 1 on the plate 50 once it is in position. As better seen in FIGS. 3 and 4 the element 1 is formed with a throughgoing passage or hole 11 centered on an axis 21 that extends horizontally parallel to the wall 5. At one axial end of this passage 1 the element 1 formed with two diametrally extending, radially inwardly open, and axially throughgoing retaining notches 14, with an annular abutment surface 12 centered on the axis 21, and with an arcuate groove 13 extending over about 140° relative to the axis 21. On its opposite axial side the element 1 is formed centered on the axis 21 with a cylindrical recess 15 having a flat floor 16 lying in a plane perpendicular to the axis 21.

Figure 5:
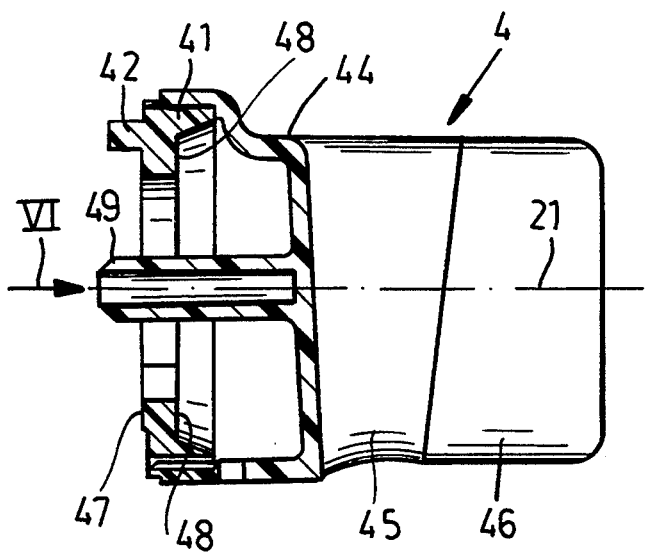
FIG. 5 is a vertical section through the holder part of the assembly.
Figure 6:
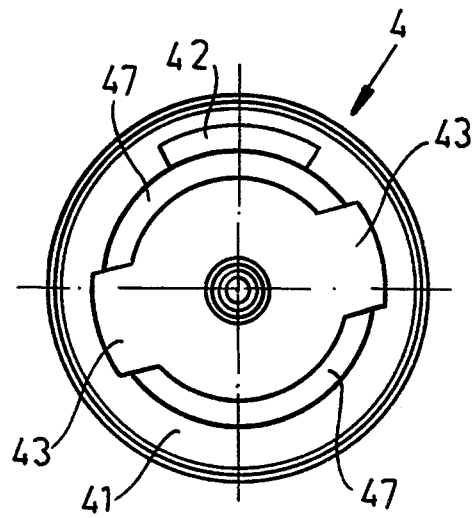
FIG. 6 is an end view taken in the direction of arrow VI of FIG. 5.

The shower holder 4 as seen in FIGS. 5 and 6 is wholly made of a durable injection-molded synthetic resin and is formed of a ring 41 ultrasonically welded inside a holder 44. The ring 41 has an annular face 48 turned away from the base part 1, centered on the axis 21, and lying in a plane perpendicular to this axis 21. In addition it has an opposite flat face 47 formed with an axially projecting tab 42 positioned to fit within the arcuate groove 13 to limit relative rotation of the parts 1 and 4 about the axis 21 and with two diametrally opposite, axially through-going, and radially inwardly open cutouts or notches 43. The holder 44 is formed with a downwardly tapered seat 45 whose centerline lies on the axis 21 and which is shaped to receive the stem of a hand shower HS shown in phantom lines in FIG. 1. The seat 45 opens as a slot 46 so that the unillustrated hose feeding the hand shower HS can slip into and out of the seat 45 as is well known. In addition the holder 44 is formed centered on the axis 21 with a centering stem 49.

Figure 7:
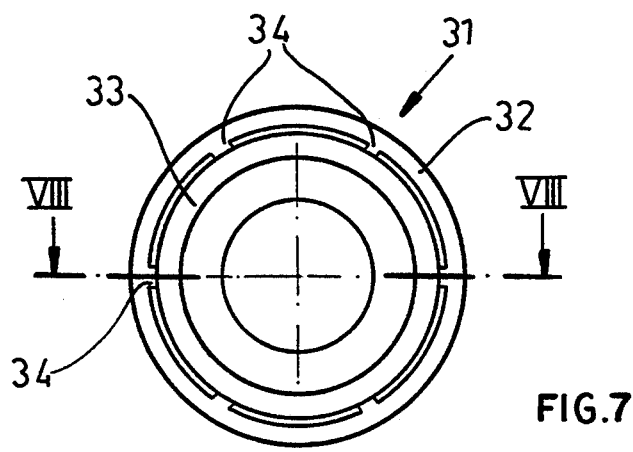
FIG. 7 is an axial end view of the spring element of this invention.
Figure 8:
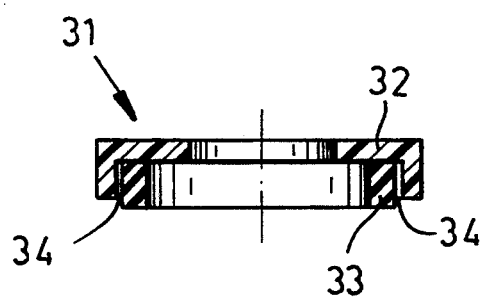
FIG. 8 is a section taken along line VIII—VIII of FIG. 7.

The spring element 31 shown in FIGS. 7 and 8 has an L-section circular outer ring part 32 made of a durable synthetic resin and an inner rectangular-section elastomeric ring 34 seated in it. Axially extending ridges 34 center the ring 33 and hold it in place. The outer diameter of the spring element 31 is slightly smaller than the inner diameter of the seat 15.

Figure 9:
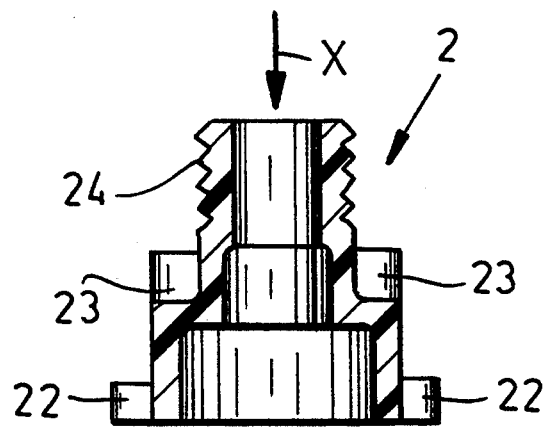
FIG. 9 is an axial section through the bolt of the invention.
Figure 10:
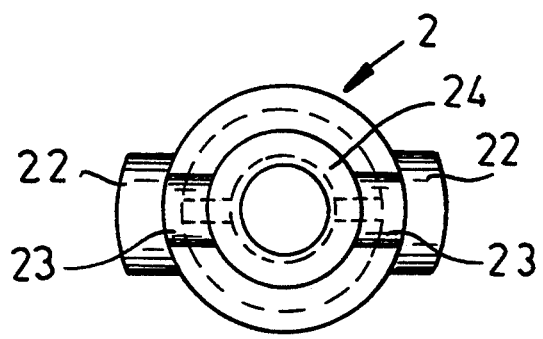
FIG. 10 is a end view taken in the direction of arrow X of FIG. 9.

FIGS. 9 and 10 show the bolt 2 which is also made of a durable injection-molded synthetic resin. It is tubular and has a small-diameter end formed with a screwthread 24 and a larger-diameter end portion formed with two radially and axially projecting tabs or ears 23 positioned to fit within the notches 14, and with a pair of end flanges 22 shaped so they can fit axially through the notches 43 of the part 4.

Figure 11:
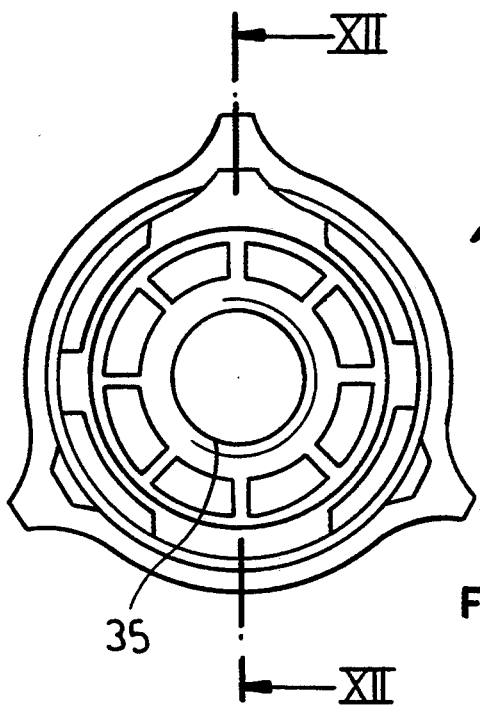
FIG. 11 is an axial end view of the nut of this invention.
Figure 12:
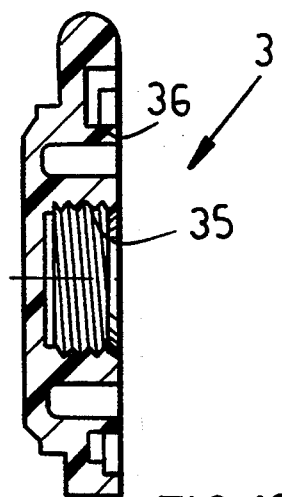
FIG. 12 is a section taken along line XII—XII of FIG. 11.

The nut 3 shown in FIGS. 11 and 12 has an internally threaded central hole 35 and an end face 36.

The device is assembled from the above-described five parts 1, 2, 3, 31, and 4 by first fitting the big end of the bolt 2 through the hole in the ring 41 and over the end of the stem 49. This can only be done with the ears 22 aligned with the cutouts 43. After the ears 22 are inside the part 4 the bolt 2 is rotated so that they bear on the surface 48.

Then the bolt 2 is pushed through the hole 11 and the spring element 31 is fitted to the seat 15, with the rubber ring 33 bearing against the floor 16 of the seat 15. The tabs 23 of the bolt 2 are positioned in the notches 14. The nut 3 is then screwed down over the threaded bolt end 24 until its face 36 bears axially on the spring element 31. This pulls the ears 22 against the surface 48 to pull the entire holder 4 against the end face 12 of the stationary base member 1, and oppositely compresses the spring element 31 between the nut 2 and the base 16 of the seat 15.

The nut 2 can be used to set the extent of compression of the spring element 31, thereby determining how much effort must be exerted to pivot the part 4 on the part 1. Since the bolt 2 is rotationally locked by the lugs 23 to the base element 1, and the nut 3 and spring 31 also bear on this stationary part, such relative pivoting about the axis 21 of the parts 1 and 4 will not relatively rotate the bolt 2 and nut 3 and change the compression setting. Furthermore the shower HS will pivot about the axis 21, giving a substantial arc of adjustment with a small radius.

We claim:

1. A bracket for supporting a hand shower adjacent a wall, the bracket comprising:
   a base part adapted to be fixed to the wall, formed with a throughgoing passage extending along a horizontal axis generally parallel to the wall, and having axially oppositely directed sides;
   a holder part pivotally mounted on the base part about the axis on one of the axial sides of the base part and with an upwardly open seat centered on the axis and adapted to receive the hand shower, one of the parts being formed centered on the axis with an angularly limited arcuate slot open axially toward the other part, the other part being formed with a lug projecting axially toward the one part and fitting in the slot, whereby the slot and lug limit the relative angular displaceability of the parts;
   a bolt extending axially through the passage and having on the other axial side of the base part a threaded end and on the one axial side of the base part a radially projecting flange that bears axially toward the base part on the holder part;
   interengaging formations on the bolt and on the base part fixing the bolt in the base part against rotation relative to the base part; and
   a nut threaded on the threaded end of the bolt and bearing axially on the other axial side of the base part.

2. The hand-shower bracket defined in claim 1 wherein the holder part is formed on its other side centered on the axis with an axially outwardly open recess, the bracket further comprising:
   a spring element seated in the recess and compressed between the base part and the nut.

3. The hand-shower bracket defined in claim 1 wherein the holder part includes a ring forming a surface against which the flange bears and a molded part forming the seat and permanently fixed to the ring.

4. The hand-shower bracket defined in claim 1 wherein the parts and bolt are made of a synthetic resin.

5. A bracket for supporting a hand shower adjacent a wall, the bracket comprising:
   a base part adapted to be fixed to the wall, formed with a throughgoing passage extending along a horizontal axis generally parallel to the wall, and having axially oppositely directed sides;

a holder part pivotally mounted on the base part about the axis on one of the axial sides of the base part and with an upwardly open seat centered on the axis and adapted to receive the hand shower, one of the parts being formed centered on the axis with an angularly limited arcuate slot open axially toward the other part, the other part being formed with a lug projecting axially toward the one part and fitting in the slot, whereby the slot and lug limit the relative angular displaceability of the parts;

a bolt extending axially through the passage and having on the other axial side of the base part a threaded end and on the one axial side of the base part a radially projecting flange that bears axially toward the base part on the holder part;

at least one axially throughgoing cutout formed on the base part and opening radially into the passage and a radially projecting tab formed on the bolt and engaged in the cutout, the cutout and tab together fixing the bolt in the base part against rotation relative to the base part; and a nut threaded on the threaded end of the bolt and bearing axially on the other axial side of the base part.

6. A bracket for supporting a hand shower adjacent a wall, the bracket comprising:

a base part adapted to be fixed to the wall, formed with a throughgoing passage extending along a horizontal axis generally parallel to the wall, and having axially oppositely directed sides;

a holder part pivotally mounted on the base part about the axis on one of the axial sides of the base part and with an upwardly open seat centered on the axis and adapted to receive the hand shower, one of the parts being formed centered on the axis with an angularly limited arcuate slot open axially toward the other part, the other part being formed with a lug projecting axially toward the one part and fitting in the slot, whereby the slot and lug limit the relative angular displaceability of the parts;

a bolt extending axially through the passage and having on the other axial side of the base part a threaded end and on the one axial side of the base part a radially projecting flange that bears axially toward the base part on the holder part, the flange formed with at least two angularly equispaced and radially outwardly projecting retaining lugs, the holder part being formed in part as a ring normally axially traversed by the bolt and having radially inwardly open notches at least as big as the respective retaining lugs, the notches being dimensioned and positioned such that the lugs can pass through the notches to engage the flange behind the ring;

interengaging formations on the bolt and on the base part fixing the bolt in the base part against rotation relative to the base part; and a nut threaded on the threaded end of the bolt and bearing axially on the other axial side of the base part.

7. A bracket for supporting a hand shower adjacent a wall, the bracket comprising:

a base part adapted to be fixed to the wall, formed with a throughgoing passage extending along a horizontal axis generally parallel to the wall, and having axially oppositely directed end faces;

a holder part pivotally mounted on the base part about the axis at one of the end faces of the base part and formed with an upwardly open seat centered on the axis and adapted to receive the hand shower;

a bolt extending axially through the passage and having at the other end face of the base part a threaded end and a radially projecting flange that bears axially on the one base-part end face toward the base part on the holder part;

interengaging formations on the bolt and on the base part fixing the bolt in the base part against rotation relative to the base part;

a nut threaded on the threaded end of the bolt; and an axially compressible spring ring engaged between the nut and the other face of the base part.

* * * * *